US008582594B2

(12) United States Patent
Lim et al.

(10) Patent No.: US 8,582,594 B2
(45) Date of Patent: Nov. 12, 2013

(54) APPARATUS AND METHOD FOR SUPPORTING PERIODIC MULTICAST TRANSMISSION IN MACHINE TYPE COMMUNICATION SYSTEM

(75) Inventors: Chi-Woo Lim, Suwon-si (KR); Hyun-Kyu Yu, Yongin-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 13/304,467

(22) Filed: Nov. 25, 2011

(65) Prior Publication Data

US 2012/0134329 A1 May 31, 2012

(30) Foreign Application Priority Data

Nov. 30, 2010 (KR) ........................ 10-2010-0120216

(51) Int. Cl.
*H04J 3/26* (2006.01)
(52) U.S. Cl.
USPC .......................... 370/432; 370/349

(58) Field of Classification Search
USPC .................. 370/329, 322, 341, 349, 431, 432
See application file for complete search history.

(56) References Cited

U.S. PATENT DOCUMENTS

| 8,279,811 | B2 * | 10/2012 | Love et al. | ..................... 370/329 |
| 8,305,984 | B2 * | 11/2012 | Lim et al. | ...................... 370/329 |
| 2011/0032925 | A1 * | 2/2011 | Lee et al. | ......................... 370/345 |
| 2012/0093116 | A1 * | 4/2012 | Kim et al. | ..................... 370/329 |
| 2012/0320837 | A1 * | 12/2012 | Kim et al. | ..................... 370/329 |

* cited by examiner

*Primary Examiner* — Brenda H Pham
(74) *Attorney, Agent, or Firm* — Jefferson IP Law, LLP

(57) ABSTRACT

An apparatus and a method for supporting periodic multicast transmission in a machine type communication system are provided. A method for operating a Base Station (BS) in a communication system includes allocating persistent resources for data transmission of a service group, selecting at least one MS to feed back a success/failure in receiving a map including the persistent resource allocation information, among Mobile Stations (MSs) to receive the persistent resource allocation information, and transmitting the map including the persistent resource allocation information and information indicating the selected MS.

30 Claims, 6 Drawing Sheets

APPARATUS AND METHOD FOR SUPPORTING PERIODIC MULTICAST TRANSMISSION IN MACHINE TYPE COMMUNICATION SYSTEM

PRIORITY

This application claims the benefit under 35 U.S.C. §119(a) of a Korean patent application filed in the Korean Intellectual Property Office on Nov. 30, 2010 and assigned Serial No. 10-2010-0120216, the entire disclosure of which is hereby incorporated by reference.

BACKGROUND OF THE INVENTION

1. Field of the Invention

The present invention relates to a machine-type communication system.

2. Description of the Related Art

Research and development is being conducted on a Machine-To-Machine (M2M) communication service that supports device-to-device data communication in an environment where direct human interaction is absent or very limited. The M2M communication service is being esteemed in terms of saving the cost of device management by automation and communication, and is being spotlighted as a technology applicable to health care, home automation, smart metering, and fleet management of vehicles or articles mounted on vehicles.

FIG. 1 is a diagram illustrating a schematic structure of an M2M communication system according to the related art.

Referring to FIG. 1, the M2M communication system includes an M2M Subscriber Station (SS) 110, an M2M Base Station (BS) 120, an Access Service Network-Gateway (ASN-GW) 130, a Connection Service Network (CSN) 140, and an M2M server 150. The M2M SS 110 is a device having application for M2M communication, which corresponds to a Mobile Station (MS). The M2M BS 120 and the ASN-GW 130 provide an access point for communication between the M2M SS 110 and the M2M server 150. In particular, the M2M BS 120 controls radio resources for communication between the M2M SS 110 and the M2M server 150. The CSN 140 provides a user-end connection service to the M2M SS 110. The M2M server 150 communicates with at least one M2M SS 110. The M2M server 150 mounts an application for M2M communication and has an interface accessible by users. The M2M server 150 may be included in the CSN 140 according to a system operation option.

A standardized communication system may be used as an air interface between the M2M SS 110 and the M2M BS 120 in the M2M communication system. For example, the Institute of Electrical and Electronic Engineers (IEEE) 802.16 communication system standard may be used as an air interface between the M2M SS 110 and the M2M BS 120. In this case, the M2M SS 110 communicates as an MS defined in the IEEE 802.16 communication system.

The M2M communication system should consider the case of supporting a device that transmits/receives limited data only for a limited time, unlike that of an MS of a general communication system. For example, a smart metering device may transmit metered values to a smart meter server only once a month, or may receive metering information from the smart meter server once a day. Also, a healthcare device may update healthcare information from a healthcare server only once a day. In many cases, the limited data are required by several devices receiving the same service in the M2M communication system.

Therefore, a need exists for an apparatus and a method that provides a scheme for managing the devices in groups, and that provides an efficient scheme for periodically providing the same data to the devices of the same group.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for periodically providing the same data to devices of the same group in an M2M communication system.

Another aspect of the present invention is to provide an apparatus and method for providing multicast data transmission to a plurality of devices in an M2M communication system.

Another aspect of the present invention is to provide an apparatus and method for determining the reception/non-reception of resource allocation information only with a minimum overhead in an M2M communication system.

Another aspect of the present invention is to provide an apparatus and method for selecting an MS to feed back a success/failure in receiving persistent resource allocation information for group data in an M2M communication system.

Another aspect of the present invention is to provide an apparatus and method for designating an MS to feed back a success/failure in receiving persistent resource allocation information for group data in an M2M communication system.

In accordance with an aspect of the present invention, a method for operating a BS in a communication system is provided. The method includes allocating persistent resources to transmit data for a service group, selecting at least one MS to feed back a success/failure in receiving a map including the persistent resource allocation information, among MSs to receive the persistent resource allocation information, and transmitting the map including the persistent resource allocation information and information indicating the selected MS.

In accordance with another aspect of the present invention, a method for operating an MS in a communication system is provided. The method includes receiving a map including persistent resource allocation information to receive data for a service group, determining whether the MS has been designated as an MS to feed back a success/failure in receiving the map, based on information indicating at least one MS to feed back a success/failure in receiving the map included in the map, and transmitting a reception success indication feedback signal if the MS has been designated as an MS to feed back a success/failure in receiving the map.

In accordance with another aspect of the present invention, an apparatus of a BS in a communication system is provided. The apparatus includes a control unit for allocating persistent resources to transmit data for a service group, and selecting at least one MS to feed back a success/failure in receiving a map including the persistent resource allocation information, among MSs to receive the persistent resource allocation information, and a modem for transmitting the map including the persistent resource allocation information and information indicating the selected MS.

In accordance with another aspect of the present invention, an apparatus of an MS in a communication system is provided. The apparatus includes a modem for receiving a map including persistent resource allocation information to receive data for a service group, and a control unit for determining whether the MS has been designated as an MS to feed back a success/failure in receiving the map, based on information indicating at least one MS to feed back a success/failure in receiving the map included in the map, and transmitting a reception success indication feedback signal if the MS has been designated as an MS to feed back a success/failure in receiving the map.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
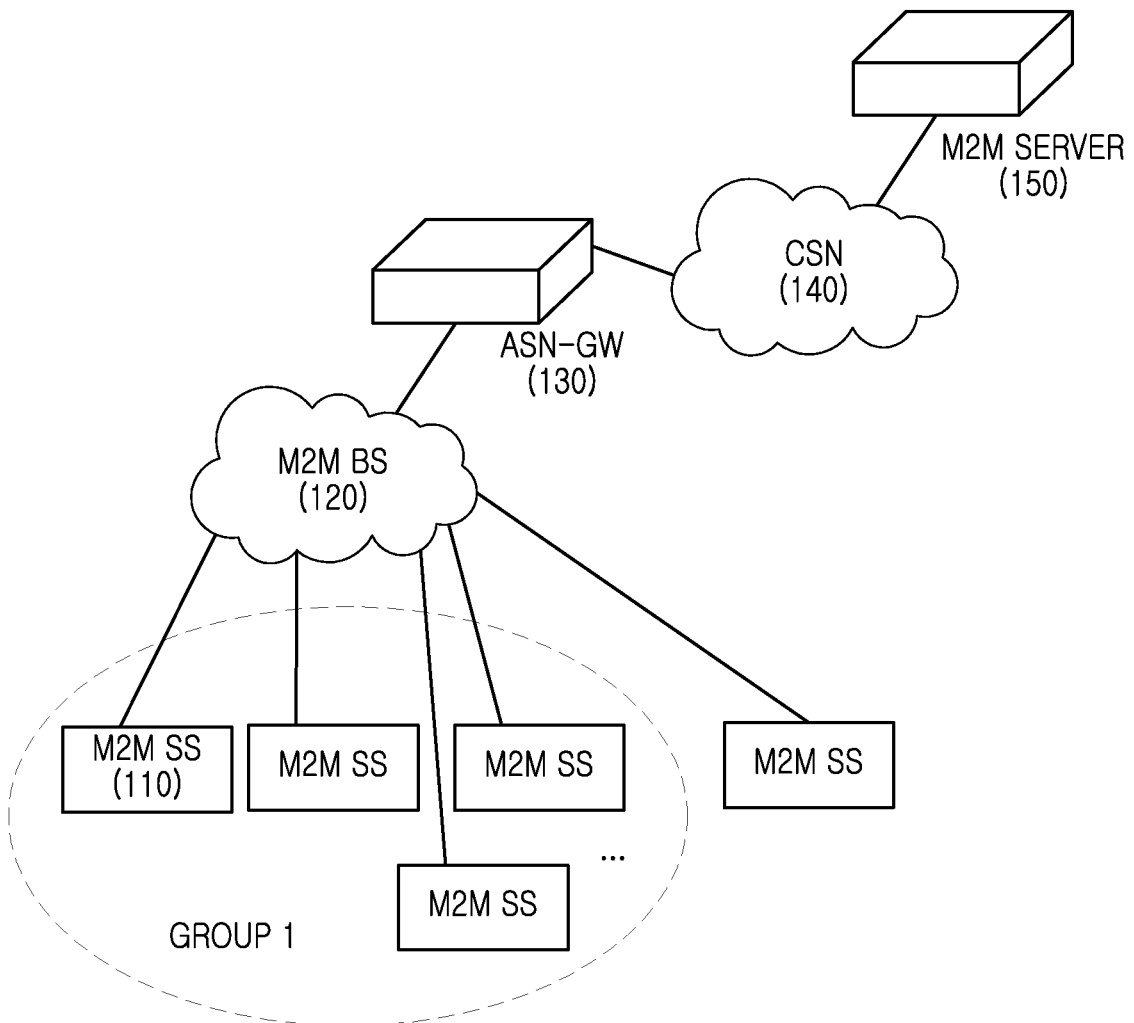
FIG. 1 is a diagram illustrating a schematic structure of an M2M communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

The present invention relates to an apparatus and method for efficiently supporting periodic multicast transmission in a machine-type communication system. Hereinafter, a description will be given of a scheme for periodically providing the same data to MSs of the same group in an M2M communication system according to exemplary embodiments of the present invention. In the following description, the terms 'M2M SS', 'M2M MS' and 'M2M device' are used in the same meaning. The below-described multicast communication scheme is applicable not only to the M2M communication system, but also to any system that uses multicast transmission.

In the M2M communication system according to exemplary embodiment of the present invention, because the same data are periodically transmitted to devices of the same group, the data are transmitted by multicast in order to prevent a resource waste caused by a plurality of unicast transmissions. Also, because the data are periodically transmitted, resources for the multicast data are allocated in a fixed manner in order to minimize a signaling overhead caused by resource allocation. Thus, resource allocation information about the data is a multicast map according to a fixed allocation method. For convenience in description, a set of MSs receiving the same data in a multicast manner will be referred to as a multicast service group or an M2M communication service group. Also, the data transmitted in a multicast manner will be referred to as group data, and a message including the resource allocation information about the group data will be referred to as a group data map.

The group data map is transmitted once prior to transmission of the group data unless resource allocation information about periodic group data and a transmission period of the periodic group data change. In addition, the group data map may be transmitted at predetermined periods or may be transmitted when a new MS enters a service group. Also, a map including the persistent resource allocation information is multicast to all the MSs of the service group. For example, in the case of a system where the map including the persistent resource allocation information is Cyclic Redundancy Check (CRC)-encoded or scrambled with a specific sequence allocated to a receiver, the persistent resource allocation information may be CRC-encoded or scrambled with a sequence shared by the MSs of the service group. The shared sequence may be a group IDentifier (ID) of the service group or may be a sequence allocated to the group for the scrambling or the CRC encoding.

Because the persistent resource allocation information included in the group data map is available in several frames, an MS failing to receive the persistent resource allocation information overlooks many multicast transmissions. What is therefore required is a process of determining whether MSs have successfully received the group data map and retransmitting the group data map when the MSs have failed to receive the group data map. Determining the reception/non-reception of the group data map with respect to all the MSs receiving the group data is not preferable because it causes an excessive overhead. Thus, the present invention designates one or more MSs to feed back a success/failure in receiving the persistent resource allocation information, wherein the number of one or more MSs to feed back a success/failure in receiving persistent resource allocation information is set to be smaller than the number of MSs to receive the persistent resource allocation information.

The criterion for selecting an MS to feed back a success/failure in receiving the persistent resource allocation information may vary according to embodiments. For example, a BS may select at least one MS having the poorest channel quality. Because it is general that each MS periodically reports a Channel Quality Indicator (CQI) to a BS, the BS may use the CQI report to compare the channel qualities of MSs. As another example, a BS may select at least one MS in consideration of the positions of MSs. In this case, the BS may select the remotest MS. If being able to find the geometry of the entire cell, the BS may select an MS that is expected to have the lowest received signal strength. In this case, it is preferable that the BS beforehand analyzes geometry information of its own cell, and it is preferable that the BS beforehand finds the position of an MS through a Global Positioning System (GPS).

Figure 2:
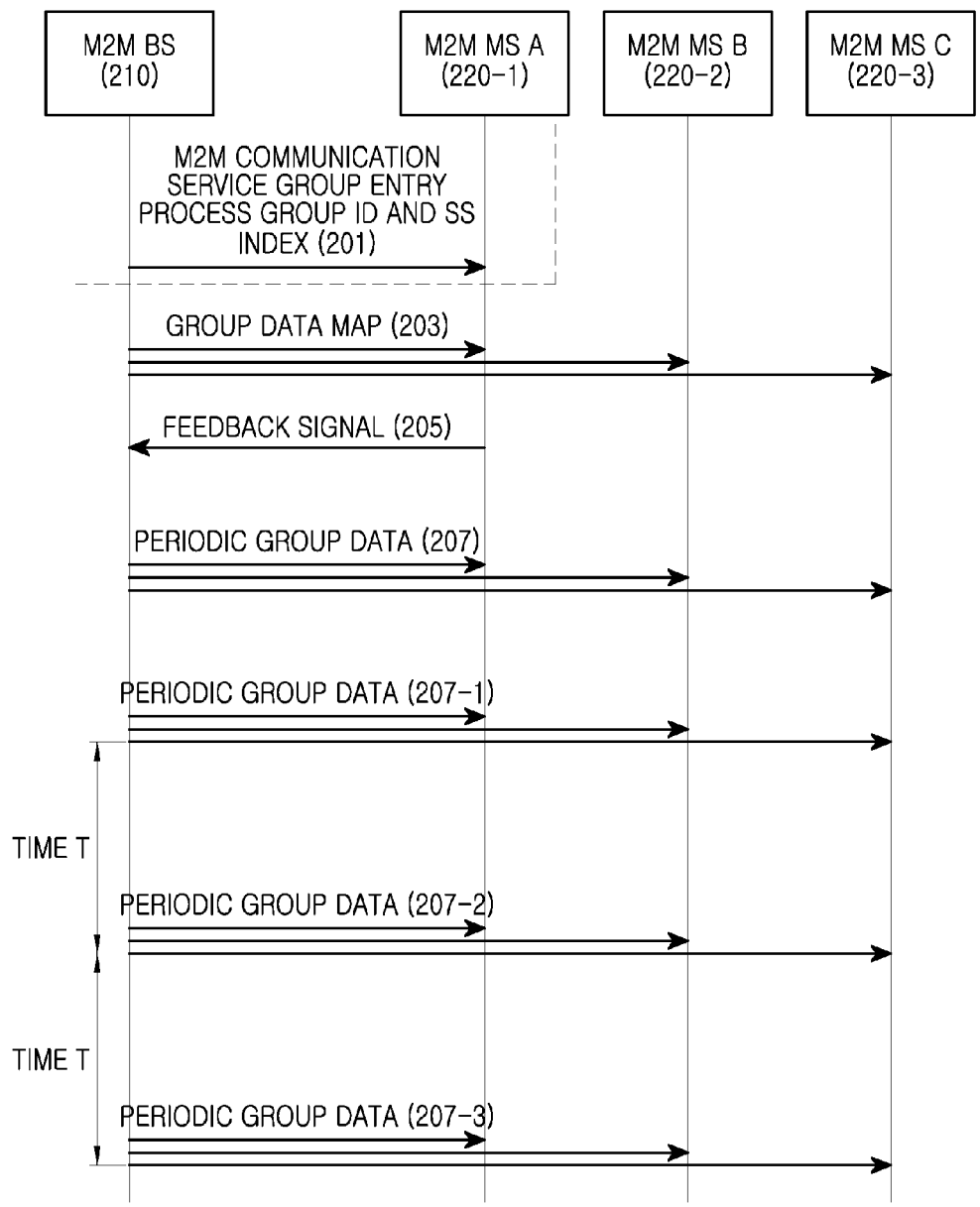
FIG. 2 is a flow diagram illustrating a signal exchange process for periodically transmitting the same dada to MSs in an M2M communication system according to an exemplary embodiment of the present invention.

FIG. 2 is a flow diagram illustrating a signal exchange process for periodically transmitting the same data to MSs in an M2M communication system according to an exemplary embodiment of the present invention. Although FIG. 2 illustrates only three MSs for convenience in description, the signal exchange process illustrated in FIG. 2 is also applicable to the case where more MSs belong to a service group.

Referring to FIG. 2, in step 201, an M2M MS A 220-1 performs a service group entry process and receives information about the service group from an M2M BS 210 through the service group entry process. The service group information includes a group ID of the service group. Also, the service group information may further include an SS index allocated to identify the M2M MS A 220-1 in the service group. The SS index is used to identify the M2M MS A 220-1 in the service group. In particular, according to an exemplary embodiment, the SS index may be used to indicate an MS to transmit feedback about a group data map, among the MSs of the service group. Herein, the service group entry process may be performed in the process of the M2M MS A 220-1 entering a network through the M2M BS 210, or may be performed in the process of the M2M MS A 220-1 performing service registration (service flow creation). In this case, an M2M MS B 220-2 has already entered the same service group as the M2M MS A 220-1.

After completion of the service group entry process, in step 203, the M2M BS 210 allocates resources for periodic transmission of group data in a fixed manner and transmits a group data map including persistent resource allocation information. If there are group data multicasted to all the MSs of the service group at predetermined periods, the persistent resource allocation information provides resource allocation information about periodic group data. Also, according to an exemplary embodiment, the group data map including the persistent resource allocation information includes information indicating at least one M2M MS to transmit feedback indicating a success/failure in receiving the group data map. Herein, the at least one M2M MS to transmit the feedback may be indicated by an SS index transmitted in step 201, or may be indicated by an M2M MS ID (e.g., a Station ID (STID)) used in the network. In the case of FIG. 2, it is assumed that the M2M MS A 220-1 is directed to transmit a feedback signal indicating a success/failure in receiving the group data map.

In step 205, among the M2M MSs 220-1 to 220-3, the M2M MS A 220-1 selected by the M2M BS 210 transmits a feedback signal indicating a success in receiving the persistent resource allocation information. For example, the feedback signal may be an ACKnowledge (ACK) signal. Herein, allocation information about resources for transmission of the feedback signal is included in the persistent resource allocation information to be provided to the M2M MS A 220-1. As illustrated in FIG. 2, the group data map may be used not only in the case of allocating persistent resources, but also in the case of deallocating the allocated persistent resources. In the case of allocating the new persistent resources, the group data map may include a persistent resource allocation period, information about allocated persistent resources, and physical layer information applied to data transmitted through the persistent resources (e.g., information about a Multiple Input Multiple Output (MIMO) mode). For example, the persistent resource allocation information may be created as shown in Table 1 below.

TABLE 1

| Syntax | Size (bit) | Description/Notes |
|---|---|---|
| DL Multi-cast Allocation A-MAP_IE( ) | | |
| { | | |
| A-MAP IE Type | 4 | |
| Allocation Period | 2 | Fixed allocation available time |
| New MAP Indicator | 1 | Indicate whether present multicast map is new transmission or retransmission 0: New transmission 1: Retransmission |
| if(Allocation Period==0b00){ | | Indicate the case of persistent resource deallocation |
| Resource Index | 11 | |
| Long TTI Indicator | 1 | |
| (Worst) User Indicator | N | Indicate MS to transmit feedback signal |
| HFA | 6 | Feedback resource allocation information |

TABLE 1-continued

| Syntax | Size (bit) | Description/Notes |
|---|---|---|
| } else if (Allocation Period != 0b00){ | | Indicate the case of new persistent resource allocation |
| $I_{SizeOffset}$ | 5 | MCS level |
| MEF | 2 | |
| if (MEF == 0b01){ | | |
|     Mt | 3 | |
|     Reserved | 1 | |
| } else if(MEF == 0b10){ | | |
|     Si | 4 | |
| } | | |
| Resource Index | 11 | |
| Long TTI Indicator | 1 | |
| (Worst) User Indicator | N | Indicate MS to transmit feedback signal |
| HFA | 6 | Feedback resource allocation information |
| } | | |
| } | | |

Thereafter, in step 207, the M2M BS 210 periodically transmits group data to the M2M MS A 220-1, the M2M MS B 220-2, and the M2M MS C 220-3 of the service group through the resources indicated by the persistent resource allocation information. If a transmission period of the group data is T, the M2M BS 210 multicasts the group data at periods of T in steps 207-1 to 207-3.

Unlike the illustration of FIG. 2, if failing to receive the group data map, the M2M MS A 220-1 does not transmit the feedback signal in step 205. Accordingly, the M2M BS 210 retransmits the group data map by determining that the M2M MS A 220-1 has failed to successfully receive the group data map. Herein, the retransmitted group data map includes information indicating the retransmission. Accordingly, the MS that has successfully received the group data map in an initial transmission mode detects and discards the retransmitted group data map.

In FIG. 2, the M2M BS 210 receives the feedback signal before multicasting the group data. However, according to another exemplary embodiment, in order to minimize a group data transmission delay, the M2M BS 210 may start periodic multicast of the group data regardless of the reception/non-reception of the feedback signal, and retransmit the group data map according to the reception/non-reception of the feedback signal.

Hereinafter, the operations and configurations of a BS and an MS communicating group data according to exemplary embodiments of the present invention will be described in detail with reference to FIGS. 3 to 6.

Figure 3:
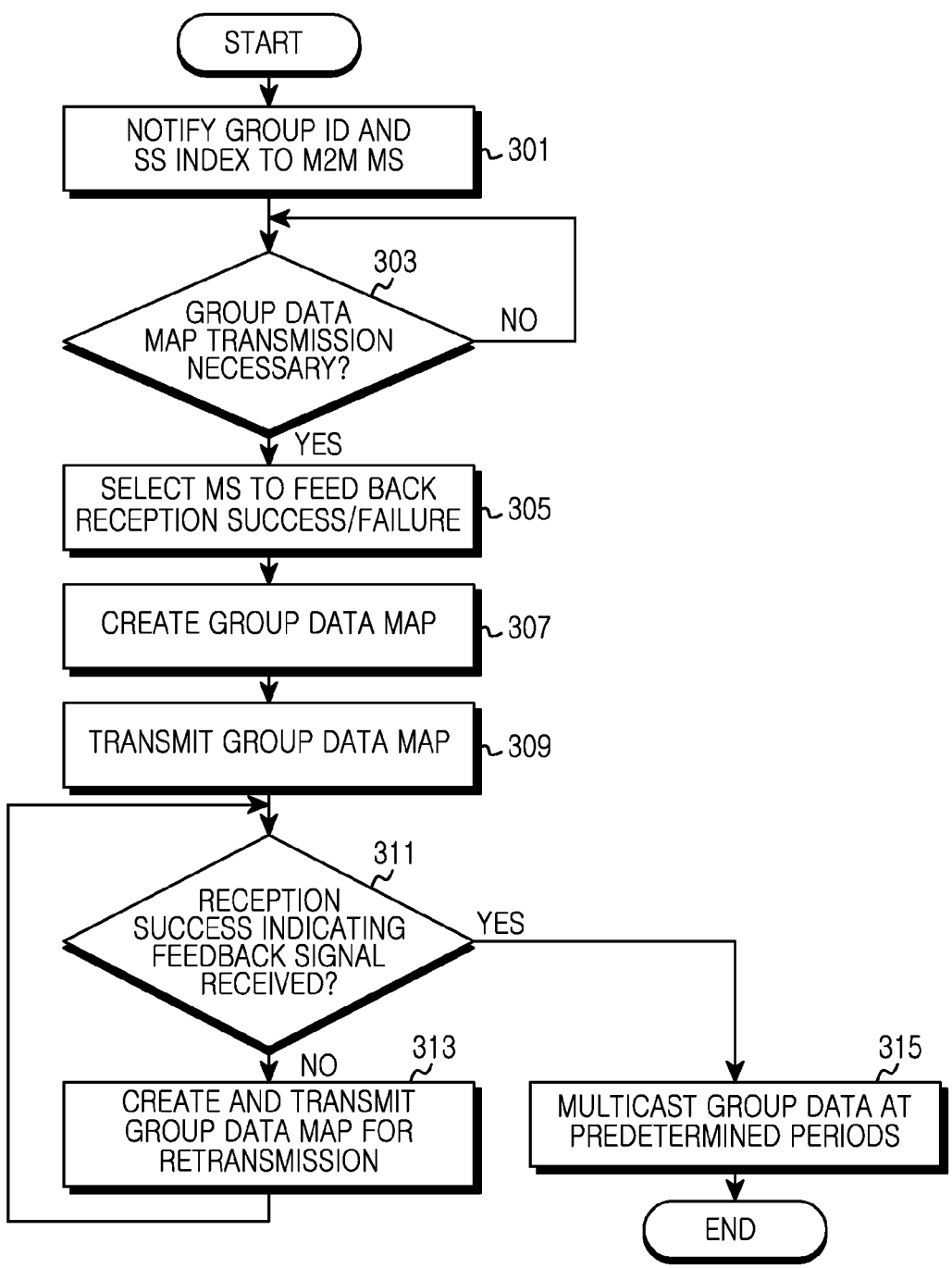
FIG. 3 is a flow diagram illustrating a process for operating a BS in an M2M communication system according to an exemplary embodiment of the present invention.

FIG. 3 is a flow diagram illustrating a process for operating a BS in an M2M communication system according to an exemplary embodiment of the present invention.

Referring to FIG. 3, in step 301, the BS notifies a group ID and an SS index to an M2M MS performing a service group entry process. The SS index may be used to identify the M2M MS in the service group. The service group entry process may be performed in the process of the M2M MS entering a network through the BS, or may be performed in the process of the M2M MS performing service registration or service flow creation.

Thereafter, in step 303, the MS determines whether it is necessary to transmit group data map. The group data map is a map message including resource allocation information for the same group data transmitted periodically to MSs of the relevant service group. It has all the MSs of the service group as receivers, and is a multicast map according to a fixed allocation method. The group data map is transmitted if new persistent resources are allocated or if the allocated persistent resources are deallocated. Also, the group data map may be retransmitted at predetermined periods or when a new MS enters the service group.

If it is necessary to transmit group data map, the BS proceeds to step 305. In step 305, the BS selects at least one MS to feed back a success/failure in receiving the group data map. For example, the BS may select at least one MS having the poorest channel quality among the MSs of the service group.

In step 307, the BS creates a group data map. The group data map includes information indicating at least one MS to transmit feedback indicating a success/failure in receiving the group data map. Herein, the at least one M2M MS to transmit the feedback may be indicated by an SS index notified in step 301, or may be indicated by an MS ID (e.g., an STID) used in the network. In the case of FIG. 2, it is assumed that the M2M MS A 220-1 is directed to transmit a feedback signal indicating a success/failure in receiving the group data map. Also, the group data map may include a persistent resource allocation period, information about allocated persistent resources, and physical layer information applied to data transmitted through the persistent resources (e.g., information about a MIMO mode). For example, the persistent resource allocation information may be created as shown in Table 1.

Thereafter, in step 309, the BS transmits the group data map. The group data map is multicast to all the MSs of the service group. For example, the group data map may be CRC-encoded or scrambled with a sequence shared by the MSs of the service group. The shared sequence may be a group ID of the service group or may be a sequence allocated to the group for the scrambling or the CRC encoding.

In step 311, the BS determines whether it receives a feedback signal indicating a reception success. The feedback signal may be received from at least one MS indicated by the group data map, through the feedback resources allocated by the group data map. If no signal is received through the feedback resources, the BS determines that the feedback signal is not received.

If the feedback signal is not received, the BS proceeds to step 313. In step 313, the BS creates a group data map for retransmission and transmits the group data map. The group data map for retransmission includes the same information as the group data map for initial transmission created in step 307, and includes information indicating retransmission. That is, the group data map for initial transmission includes information indicating initial transmission, and the group data map for retransmission includes information indicating retransmission. Then, the BS returns to step 311.

In contrast, if it is determined in step 313 that the feedback signal is received, the BS proceeds to step 315. In step 315, the BS determines that the MSs of the service group has received the group data map, and multicasts group data at predetermined periods. That is, the BS multicasts group data, which is received from an M2M server and requires periodic transmission, through the persistent resources allocated by the group data map.

In the operation process of FIG. 3, the BS detects reception of a feedback signal in step 311 and multicasts the group data in step 315. However, according to another exemplary embodiment, the BS may multicast the group data regardless of the reception/non-reception of the feedback signal. In this case, the BS determines the reception/non-reception of the feedback signal during the periodic multicast of the group data, and retransmits the group data when failing to receive the feedback signal.

Figure 4:
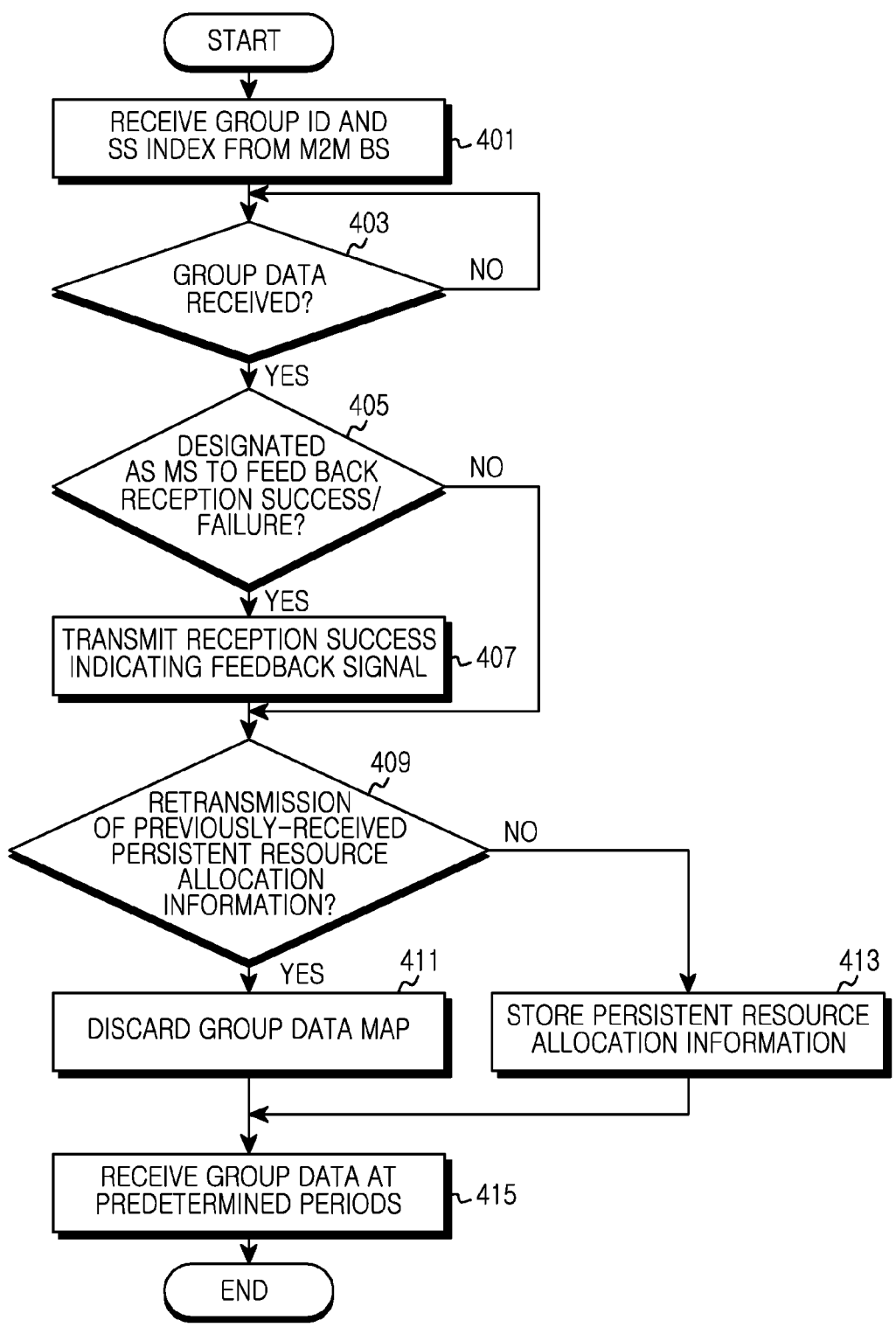
FIG. 4 is a flow diagram illustrating a process for operating an MS in an M2M communication system according to an exemplary embodiment of the present invention.

FIG. 4 is a flow diagram illustrating a process for operating an MS in an M2M communication system according to an exemplary embodiment of the present invention.

Referring to FIG. 4, in step 401, the MS receives a group ID and an SS index from an M2M BS through a service group entry process. The SS index may be used to identify the MS in the service group. The service group entry process may be performed in the process of the MS entering a network through the BS, or may be performed in the process of the MS performing service registration or service flow creation.

Thereafter, in step 403, the MS determines whether a group data map is received. The group data map is a map message including resource allocation information for the same group data transmitted periodically to MSs of the relevant service group. It has all the MSs of the service group as receivers, and is a multicast map according to a fixed allocation method. The group data map is transmitted if new persistent resources are allocated or if the allocated persistent resources are deallocated. Also, the group data map may be retransmitted at predetermined periods or when a new MS enters the service group. The group data map may include a persistent resource allocation period, information about allocated persistent resources, and physical layer information applied to data transmitted through the persistent resources (e.g., information about a MIMO mode). For example, the persistent resource allocation information may be created as shown in Table 1.

If the group data map is received, the MS proceeds to step 405. In step 405, the MS determines whether it has been designated as an MS to feed back a reception success/failure. That is, the group data map includes information designating at least one MS to transmit feedback indicating a success/failure in receiving the group data map. The MS that is designated to transmit the feedback may be indicated by the SS index notified in step 301, or may be indicated by an MS ID (e.g., an STID) used in the network.

If an MS is designated to transmit the feedback, in step 407, the designated MS transmits a feedback signal indicating a reception success. The feedback signal is transmitted through the resources allocated by the group data map.

Thereafter, in step 409, the MS determines whether the received group data map is a retransmission of the previously-received group data map. That is, the MS determines whether the received group data map is a group data map including the previously-stored persistent resource allocation information. The group data map includes information indicating transmission/retransmission. Thus, the MS determines that the received group data map is a retransmission of the previously-received group data map, if it has received a map including initial transmission indication information, and the received group data map includes retransmission indication information and includes the same persistent resource allocation information as the initially-transmitted group data map.

If the received group data map is a retransmission of the previously-received group data map, the MS proceeds to step 411. In step 411, the MS discards the group data map. That is, because the MS has received the information overlapping with the previously-received group data map, it retains the previously-stored persistent resource allocation information and discards the received group data map. Thereafter, in step 415, the MS receives group data at periods defined in the stored persistent resource allocation information.

In contrast, if it is determined in step 409 that the received group data map is not a retransmission of the previously-received group data map, that is, if the group data map is an initial transmission or a retransmission that has not been previously received, the MS proceeds to step 413. In step 413, the MS stores the persistent resource allocation information of the received group data map in the storage unit. Thereafter, in step 415, the MS receives group data at periods defined in the stored persistent resource allocation information.

Figure 5:
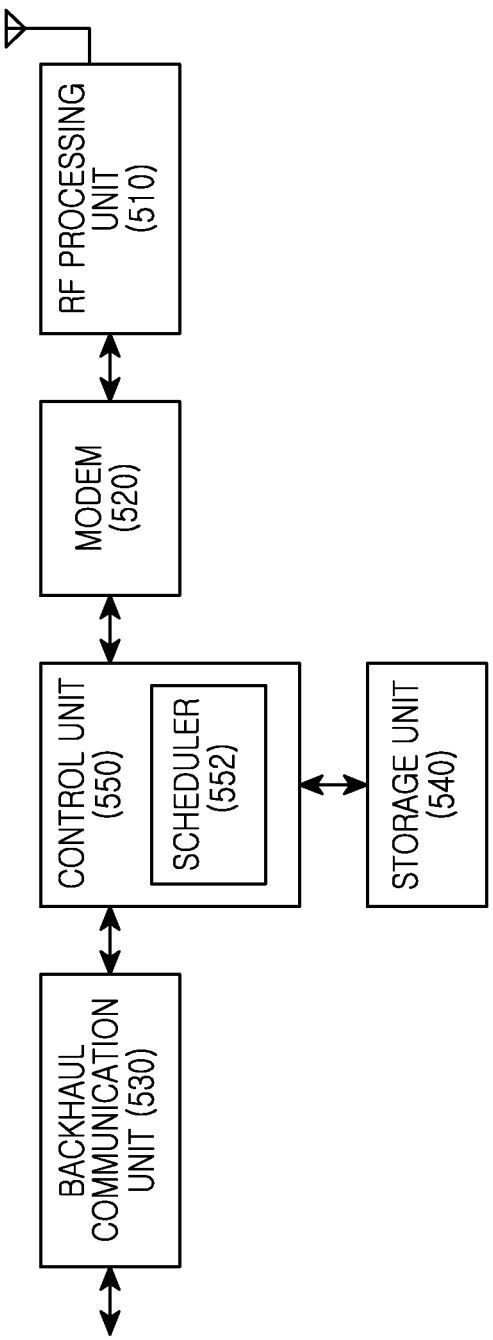
FIG. 5 is a block diagram of a BS in an M2M communication system according to an exemplary embodiment of the present invention.

FIG. 5 is a block diagram of a BS in an M2M communication system according to an exemplary embodiment of the present invention.

Referring to FIG. 5, the BS may include a Radio Frequency (RF) processing unit 510, a modem 520, a backhaul communication unit 530, a storage unit 540, and a control unit 550.

The RF processing unit 510 performs functions (e.g., signal band conversion and amplification) for communicating signals through a wireless channel. That is, the RF processing unit 510 up-converts a baseband signal, received from the modem 520, into an RF signal, and transmits the RF signal through an antenna. Also, the RF processing unit 510 down-converts a RF signal, received through the antenna, into a baseband signal. For example, the RF processing unit 510 may include an amplifier, a mixer, an oscillator, a Digital-to-Analog Converter (DAC), and an Analog-to-Digital Converter (ADC).

The modem 520 performs conversion between a baseband signal and a bit string according to the physical layer standard of the system. For example, according to an OFDM (Orthogonal Frequency Division Multiplexing) scheme, in a data transmission (TX) mode, the modem 520 encodes/modulates a TX bit string to generate complex symbols, maps the complex symbols to subcarriers, and generates OFDM symbols by Inverse Fast Fourier Transform (IFFT) operation and Cyclic Prefix (CP) insertion. Also, in a data reception (RX) mode, the modem 520 divides a baseband signal, received from the RF processing unit 510, into OFDM symbols, restores signals mapped to subcarriers by FFT operation, and restores an RX bit string by demodulation and decoding.

The backhaul communication unit 530 provides an interface for allowing the BS to communicate with another node (e.g., an M2M server) in the network. That is, the backhaul communication unit 530 converts a bit string, transmitted from the BS to the other node, into a physical signal, and converts a physical signal, received from the other node, into a bit string.

The storage unit 540 stores data such as TX/RX traffic, system setting information, and program codes for operation of the BS. Also, the storage unit 540 provides the stored data at the request of the control unit 550.

The control unit 550 controls an overall operation of the BS. For example, the control unit 550 generates TX traffic packets and messages and provides the same to the modem 520. Also, the control unit 550 interprets RX traffic packets and messages received from the modem 520. The control unit 550 includes a scheduler 552 that allocates radio resources for communication with MSs. The control unit 550 controls a function for providing an M2M communication service. For example, the control unit 550 performs a service group entry process with an M2M MS. In the service group entry process, the control unit 550 notifies a group ID and an SS index to the M2M MS. The SS index may be used to identify the M2M MS in the service group. In particular, the control unit 550 controls a function for periodically transmitting group data to MSs of a service group. Specifically, in order to periodically transmit the group data, the control unit 550 performs a control operation to transmit a group data map including persistent resource allocation information for group data according to the resource allocation result of the scheduler 552, and determines a success/failure in receiving the group data map.

A process of transmitting the group data map is as follows. If it is necessary to transmit the group data map, the control unit 550 selects at least one MS to feed back a success/failure in receiving the group data map. For example, the BS may select at least one MS having the poorest channel quality among the MSs entering a service group. Also, the control unit 550 creates a group data map, which includes information indicating at least one MS to transmit feedback indicating a success/failure in receiving the group data map, a persistent resource allocation period, information about allocated persistent resources, and physical layer information applied to data transmitted through the persistent resources (e.g., information about an MIMO mode), and transmits the group data map through the modem 520 and the RF processing unit 510. For example, the group data map may be created as shown in Table 1. The group data map is multicast to all the MSs of a service group. For example, the group data map may be CRC-encoded or scrambled with a sequence shared by the MSs of the service group.

A process of determining a success/failure of reception of the group data map is as follows. After transmitting the group data map, the control unit 550 determines whether a feedback signal indicating a reception success is received. If the feedback signal is not received, the control unit 550 creates a group data map for retransmission and transmits the group data map. The group data map for retransmission includes the same information as a group data map for initial transmission, and includes information indicating retransmission. In contrast, if the feedback signal is received, the control unit 550 determines that the MSs of the service group has received the group data map. Accordingly, the control unit 550 multicasts group data at predetermined periods.

In the above-described embodiment, after detecting reception of the feedback signal, the control unit 550 multicasts the group data in step 315. However, according to another exemplary embodiment, the control unit 550 may multicast the group data regardless of the reception/non-reception of the feedback signal. In this case, the control unit 550 determines the reception/non-reception of the feedback signal during the periodic multicast of the group data, and retransmits the group data when failing to receive the feedback signal.

Figure 6:
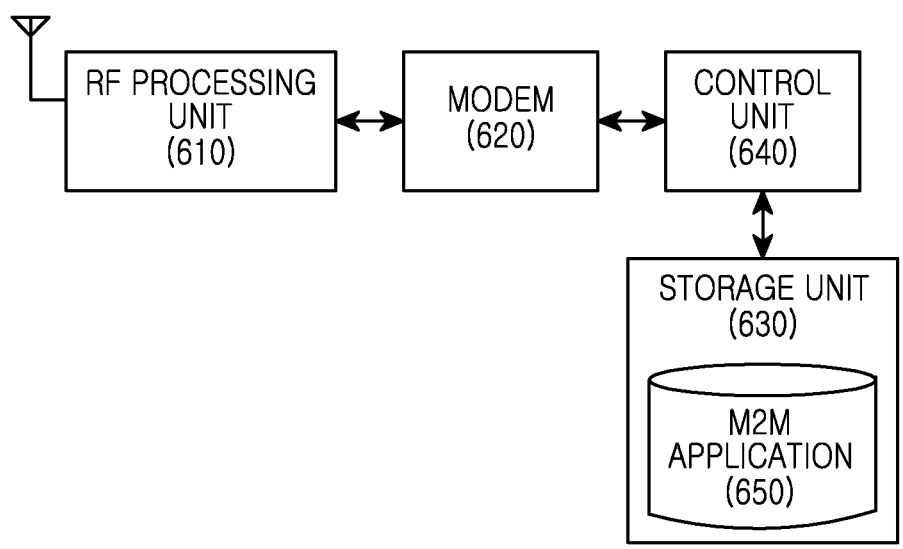
FIG. 6 is a block diagram of an MS in an M2M communication system according to an exemplary embodiment of the present invention.

FIG. 6 is a block diagram of an MS in an M2M communication system according to an exemplary embodiment of the present invention.

Referring to FIG. 6, the MS may include an RF processing unit 610, a modem 620, a storage unit 630, and a control unit 640.

The RF processing unit 610 performs functions (e.g., signal band conversion and amplification) for communicating signals through a wireless channel. That is, the RF processing unit 610 up-converts a baseband signal, received from the modem 620, into an RF signal, and transmits the RF signal through an antenna. Also, the RF processing unit 610 down-converts a RF signal, received through the antenna, into a baseband signal. For example, the RF processing unit 610 may include an amplifier, a mixer, an oscillator, a DAC, and an ADC.

The modem 620 performs conversion between a baseband signal and a bit string according to the physical layer standard of the system. For example, according to an OFDM scheme, in a data transmission (TX) mode, the modem 620 encodes/modulates a TX bit string to generate complex symbols, maps the complex symbols to subcarriers, and generates OFDM symbols by IFFT operation and CP insertion. Also, in a data reception (RX) mode, the modem 620 divides a baseband signal, received from the RF processing unit 610, into OFDM symbols, restores signals mapped to subcarriers by FFT operation, and restores an RX bit string by demodulation and decoding.

The storage unit 630 stores data such as user data, applications, TX/RX traffic, system setting information, and program codes for operation of the MS. Also, the storage unit 630 provides the stored data at the request of the control unit 640. In particular, the storage unit 630 stores an M2M application 650 for operation as an M2M SS.

The control unit 640 controls an overall operation of the MS. For example, the control unit 640 generates TX traffic packets and messages and provides the same to the modem 620. Also, the control unit 620 interprets RX traffic packets and messages received from the modem 620. The control unit 640 controls a function for receiving an M2M communication service. For example, the control unit 640 performs a service group entry process with an M2M BS. In the service group entry process, the control unit 640 acquires a group ID and an SS index from the M2M BS. The SS index may be used to identify the MS in the service group. In particular, the control unit 640 controls a function for periodically receiving group data. Specifically, in order to periodically receive the group data, the control unit 640 acquires a group data map including persistent resource allocation information for group data, and feeds back a success/failure in receiving the group data map.

A process of acquiring persistent resource allocation information through the group data map is as follows. When a group data map, which includes a persistent resource allocation period, information about allocated persistent resources, and physical layer information applied to data transmitted through the persistent resources (e.g., information about an MIMO mode), is received through the RF processing unit 610 and modem 620, the control unit 640 determines whether the group data map is a retransmission of the previously-received group data map based on transmission/retransmission indication information included in the group data map. If the group data map is a retransmission of the previously-received group data map, the control unit 640 discards the group data map. In contrast, if the group data map is not a retransmission of the previously-received group data map, that is, if the group data map is an initial transmission or a retransmission that has not been previously received, the control unit 640 stores the persistent resource allocation information of the group data map in the storage unit 630. Thereafter, the control unit 640 performs a control operation to receive group data at periods defined in the persistent resource allocation information stored in the storage unit 630.

A process of feeding back a success/failure of reception of the group data map is as follows. The group data map includes information indicating at least one MS to transmit feedback indicating a success/failure in receiving the group data map. Thus, when receiving the group data map, the control unit 640 determines whether the MS has been designated as an MS to feed back a reception success/failure. At least one MS to transmit the feedback may be indicated by an SS index acquired through the service group entry process, or may be indicated by an MS ID (e.g., an STID) used in the network. If the MS is the MS to transmit the feedback, the control unit 640 controls the modem 620 to transmit a feedback signal indicating a reception success.

As described above, if the same data are periodically transmitted to the devices of the same service group in the communication system, the transmission resources for the data are allocated in a fixed manner. Accordingly, the present invention may efficiently support multicast data transmission without using a complex broadcast service scheme or increasing a resource allocation overhead. Also, a success/failure in receiving the group data map is fed back from fewer MSs than the number of MSs to receive the group data. Accordingly, the present invention may determine a success/failure in receiving the group data map only with a minimum overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Base Station (BS) in a communication system, the method comprising:
    allocating a plurality of persistent resources to transmit data for a service group;
    selecting at least one Mobile Station (MS) to feed back a success/failure in receiving a map including persistent resource allocation information, from among a plurality of MSs, to receive the persistent resource allocation information;
    transmitting the map including the persistent resource allocation information and information indicating the at least one MS selected to feed back the success/failure in receiving the map; and
    receiving a reception success indication feedback signal from the at least one MS.

2. The method of claim 1, wherein the at least one MS to feed back the success/failure in receiving the map comprises at least one MS having the poorest channel quality.

3. The method of claim 1, wherein the at least one MS to feed back the success/failure in receiving the map is designated by an index allocated to identify the plurality of the MSs in a service group.

4. The method of claim 1, wherein the at least one MS to feed back the success/failure in receiving the map is designated by an MS IDentifier (ID) used in a network.

5. The method of claim 1, further comprising retransmitting the map when a reception success indication signal is not received from the selected at least one MS.

6. The method of claim 5, wherein the map includes at least one of retransmission indication information and initial transmission indication information.

7. The method of claim 1, wherein the map comprises the persistent resource allocation information as shown in the following table;

| Syntax | Size (bit) | Description/Notes |
| --- | --- | --- |
| DL Multi-cast Allocation A-MAP_IE( ) { | | |
|   A-MAP IE Type | 4 | |
|   Allocation Period | 2 | Fixed allocation available time |
|   New MAP Indicator | 1 | Indicate whether present multicast map is new transmission or retransmission<br>0: New transmission<br>1: Retransmission |
|   if(Allocation Period==0b00){ | | Indicate the case of persistent resource deallocation |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } else if (Allocation Period != 0b00){ | | Indicate the case of new persistent resource allocation |
|     $I_{SizeOffset}$ | 5 | MCS level |
|     MEF | 2 | |
|     if (MEF == 0b01){ | | |
|       Mt | 3 | |
|       Reserved | 1 | |
|     } else if(MEF == 0b10){ | | |
|       Si | 4 | |
|     } | | |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } | | |
| }. | | |

8. A method for operating a Mobile Station (MS) in a communication system, the method comprising:
    receiving a map including persistent resource allocation information to receive data for a service group and information indicating at least one MS selected to feed back a success/failure in receiving the map; and when the MS is the at least one MS selected to feed back the success/failure in receiving the map, transmitting, by the selected MS, a reception success indication feedback signal.

9. The method of claim 8, wherein the MS to feed back the success/failure in receiving the map comprises at least one MS having the poorest channel quality.

10. The method of claim 8, wherein the MS to feed back the success/failure in receiving the map is designated by an index allocated to identify a plurality of MSs in a service group.

11. The method of claim 8, wherein the MS to feed back the success/failure in receiving the map is designated by an MS IDentifier (ID) used in a network.

12. The method of claim 8, wherein the map includes at least one of retransmission indication information and initial transmission indication information.

13. The method of claim 12, further comprising:
    determining whether the map includes prestored persistent resource allocation information;
    discarding the map when the map includes the prestored persistent resource allocation information; and
    storing the persistent resource allocation information of the map when the map does not include the prestored persistent resource allocation information.

14. The method of claim 13, wherein determining whether the map includes the prestored persistent resource allocation information comprises:
    determining that the map includes the prestored persistent resource allocation information, when a map including the initial transmission indication information has been received, and the map includes the retransmission indication information and includes the same persistent resource allocation information as the map including the initial transmission indication information; and determining that the map does not include the prestored persistent resource allocation information, when the map includes the initial transmission indication information or when the map includes the retransmission indication information, but a map including the initial transmission indication information has not been received.

15. The method of claim 8, wherein the map comprises the persistent resource allocation information as shown in the following table;

| Syntax | Size (bit) | Description/Notes |
|---|---|---|
| DL Multi-cast Allocation A-MAP_IE( ) | | |
| { | | |
|   A-MAP IE Type | 4 | |
|   Allocation Period | 2 | Fixed allocation available time |
|   New MAP Indicator | 1 | Indicate whether present multicast map is new transmission or retransmission 0: New transmission 1: Retransmission |
|   if(Allocation Period==0b00){ | | Indicate the case of persistent resource deallocation |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } else if (Allocation Period != 0b00){ | | Indicate the case of new persistent resource allocation |
|     $I_{SizeOffset}$ | 5 | MCS level |
|     MEF | 2 | |
|     if (MEF == 0b01){ | | |
|       Mt | 3 | |
|       Reserved | 1 | |
|     } else if(MEF == 0b10){ | | |
|       Si | 4 | |
|     } | | |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } | | |
| }. | | |

16. An apparatus of a Base Station (BS) in a communication system, the apparatus comprising:
a control unit for allocating a plurality of persistent resources to transmit data for a service group, and selecting at least one Mobile Station (MS) to feed back a success/failure in receiving a map including persistent resource allocation information, from among a plurality of MSs, to receive persistent resource allocation information; and
a modem for transmitting the map including the persistent resource allocation information and information indicating the at least one MS selected to feed back the success/failure in receiving the map, and for receiving a reception success indication feedback signal from the at least one MS.

17. The apparatus of claim 16, wherein the at least one MS to feed back the success/failure in receiving the map comprises at least one MS having the poorest channel quality.

18. The apparatus of claim 16, wherein the at least one MS to feed back the success/failure in receiving the map is designated by an index allocated to identify the plurality of the MSs in a service group.

19. The apparatus of claim 16, wherein the at least one MS to feed back the success/failure in receiving the map is designated by an MS IDentifier (ID) used in a network.

20. The apparatus of claim 16, wherein the modem retransmits the map when a reception success indication signal is not received from the selected at least one MS.

21. The apparatus of claim 20, wherein the map includes at least one of retransmission indication information and initial transmission indication information.

22. The apparatus of claim 16, wherein the map comprises the persistent resource allocation information as shown in the following table;

| Syntax | Size (bit) | Description/Notes |
|---|---|---|
| DL Multi-cast Allocation A-MAP_IE( ) | | |
| { | | |
|   A-MAP IE Type | 4 | |
|   Allocation Period | 2 | Fixed allocation available time |
|   New MAP Indicator | 1 | Indicate whether present multicast map is new transmission or retransmission 0: New transmission 1: Retransmission |
|   if(Allocation Period==0b00){ | | Indicate the case of persistent resource deallocation |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } else if (Allocation Period != 0b00){ | | Indicate the case of new persistent resource allocation |
|     $I_{SizeOffset}$ | 5 | MCS level |
|     MEF | 2 | |
|     if (MEF == 0b01){ | | |
|       Mt | 3 | |
|       Reserved | 1 | |
|     } else if(MEF == 0b10){ | | |
|       Si | 4 | |
|     } | | |
|     Resource Index | 11 | |
|     Long TTI Indicator | 1 | |
|     (Worst) User Indicator | N | Indicate MS to transmit feedback signal |
|     HFA | 6 | Feedback resource allocation information |
|   } | | |
| }. | | |

23. An apparatus of a Mobile Station (MS) in a communication system, the apparatus comprising:
a modem for receiving a map including persistent resource allocation information to receive data for a service group and information indicating at least one MS selected to feed back a success/failure in receiving the map; and a control unit for, when the MS is the at least one MS selected, feeding back the success/failure in receiving the map, and for transmitting, by the selected MS, a reception success indication feedback signal.

24. The apparatus of claim 23, wherein the MS to feed back the success/failure in receiving the map comprises at least one MS having the poorest channel quality.

25. The apparatus of claim 23, wherein the MS to feed back the success/failure in receiving the map is designated by an index allocated to identify a plurality of MSs in a service group.

26. The apparatus of claim 23, wherein the MS to feed back the success/failure in receiving the map is designated by an MS IDentifier (ID) used in a network.

27. The apparatus of claim 23, wherein the map includes at least one of retransmission indication information and initial transmission indication information.

28. The apparatus of claim 27, wherein the control unit discards the map when the map includes prestored persistent resource allocation information, and stores the persistent resource allocation information of the map when the map does not include the prestored persistent resource allocation information.

29. The apparatus of claim 28, wherein the control unit determines that the map includes the prestored persistent resource allocation information, when a map including the initial transmission indication information has been received, and the map includes the retransmission indication information and includes the same persistent resource allocation information as the map including the initial transmission indication information, and determines that the map does not include the prestored persistent resource allocation information, when the map includes the initial transmission indication information or when the map includes the retransmission indication information, but a map including the initial transmission indication information has not been received.

30. The apparatus of claim 23, wherein the map comprises the persistent resource allocation information as shown in the following table;

| Syntax | Size (bit) | Description/Notes |
|---|---|---|
| DL Multi-cast Allocation A-MAP_IE( ) { | | |
|     A-MAP IE Type | 4 | |
|     Allocation Period | 2 | Fixed allocation available time |
|     New MAP Indicator | 1 | Indicate whether present multicast map is new transmission or retransmission 0: New transmission 1: Retransmission |
|     if(Allocation Period==0b00){ | | Indicate the case of persistent resource deallocation |
|         Resource Index | 11 | |
|         Long TTI Indicator | 1 | |
|         (Worst) User Indicator | N | Indicate MS to transmit feedback signal |
|         HFA | 6 | Feedback resource allocation information |
|     } else if (Allocation Period != 0b00){ | | Indicate the case of new persistent resource allocation |
|         $I_{SizeOffset}$ | 5 | MCS level |
|         MEF | 2 | |
|         if (MEF == 0b01){ | | |
|             Mt | 3 | |
|             Reserved | 1 | |
|         } else if(MEF == 0b10){ | | |
|             Si | 4 | |
|         } | | |
|         Resource Index | 11 | |
|         Long TTI Indicator | 1 | |
|         (Worst) User Indicator | N | Indicate MS to transmit feedback signal |
|         HFA | 6 | Feedback resource allocation information |
|     } | | |
| }. | | |

* * * * *